US012753872B2

(12) United States Patent
Nakamura et al.

(10) Patent No.: US 12,753,872 B2
(45) Date of Patent: Oct. 6, 2026

(54) JOINT STRUCTURE

(71) Applicant: FUJIKIN INCORPORATED, Osaka (JP)

(72) Inventors: Nobuo Nakamura, Osaka (JP); Tomohiro Nakata, Osaka (JP); Kazunari Watanabe, Osaka (JP); Nobuhiro Hashimoto, Osaka (JP); Hidehiro Doya, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 19/216,850

(22) Filed: May 23, 2025

(65) Prior Publication Data

US 2025/0283562 A1 Sep. 11, 2025

Related U.S. Application Data

(63) Continuation of application No. PCT/JP2023/037694, filed on Oct. 18, 2023.

(30) Foreign Application Priority Data

Nov. 25, 2022 (JP) ................................ 2022-187996

(51) Int. Cl.

| | |
|---|---|
| ***F16L 41/08*** | (2006.01) |
| ***F16L 23/028*** | (2006.01) |
| ***F16L 23/18*** | (2006.01) |

(52) U.S. Cl.

CPC ......... *F16L 41/086* (2013.01); *F16L 23/0283* (2013.01); *F16L 23/18* (2013.01)

(58) Field of Classification Search

CPC ... F16L 23/0283; F16L 23/0286; F16L 23/18; F16L 23/16; F16L 23/032; F16L 41/086

See application file for complete search history.

(56) References Cited

U.S. PATENT DOCUMENTS

| | | | | |
|---|---|---|---|---|
| 5,354,101 | A * | 10/1994 | Anderson, Jr. ....... | F16L 41/086 |
| 6,386,593 | B1 * | 5/2002 | Slais ..................... | F16L 23/032 |
| 6,481,756 | B1 * | 11/2002 | Field ..................... | F16L 41/086 |

(Continued)

FOREIGN PATENT DOCUMENTS

| | | | |
|---|---|---|---|
| FR | 2883063 | A1 | 9/2006 |
| JP | 2005164021 | A | 6/2005 |
| JP | 2013068268 | A | 4/2013 |

*Primary Examiner* — William S. Choi

(74) *Attorney, Agent, or Firm* — CANTOR COLBURN LLP

(57) ABSTRACT

A joint structure includes an upper block arranged on a lower block, a sleeve inserted into the upper block, an auxiliary member provided on an upper surface of the upper block, a pin in which a first shaft portion is inserted into a first pin insertion slit and a second pin insertion slit, and a first male threaded portion is screwed into the lower block, and a bolt. The first pin insertion slit of the upper block opens to one side surface of the upper block in a longitudinal direction, the second pin insertion slit of the auxiliary member opens to one side surface of the auxiliary member in the longitudinal direction. A lower surface of the auxiliary member is formed by a pair of inclined surfaces that gradually extends away from an upper surface of the auxiliary member from both ends in the longitudinal direction toward a center.

4 Claims, 6 Drawing Sheets

(56) References Cited

U.S. PATENT DOCUMENTS

| | | | | |
|---|---|---|---|---|
| 7,425,021 | B2 * | 9/2008 | Yamanashi | F16L 41/086 |
| 7,766,391 | B2 * | 8/2010 | Kim | F16L 23/18 |
| 8,468,849 | B2 * | 6/2013 | Kesler | F16L 41/086 |
| 9,114,687 | B2 * | 8/2015 | Dorland | |
| 9,556,993 | B2 * | 1/2017 | Kesler | F16L 23/18 |
| 11,067,202 | B2 * | 7/2021 | Ortega Gomez | F16L 41/086 |
| 11,754,204 | B2 * | 9/2023 | Kesler | |
| 2002/0117850 | A1 * | 8/2002 | Wood | F16L 23/0283 |
| 2014/0333067 | A1 * | 11/2014 | Okabe | F16L 23/0283 |

* cited by examiner

JOINT STRUCTURE

CROSS REFERENCE TO RELATED APPLICATION

This application is a continuation under 35 U.S.C. § 120 of No. PCT/JP2023/037694, filed Oct. 18, 2023, which is incorporated herein by reference, and which claimed priority to Japanese Application No. 2022-187996, filed Nov. 25, 2022. The present application likewise claims priority under 35 U.S.C. § 119 to Japanese Application No. 2022-187996, filed Nov. 25, 2022, the entire content of which is also incorporated herein by reference.

TECHNICAL FIELD

The present disclosure relates to a joint structure for use in semiconductor manufacturing equipment and the like.

BACKGROUND

Japanese Patent Application Publication No. 2005-164021 discloses a joining device for joining an upper block and a lower block. In the joining device of Patent Literature 1, a positioning pin is fixed to the lower block and inserted from above into a pin insertion hole of the upper block, and the upper block and the lower block are overlapped. Next, a notch of an auxiliary member is fitted into the small diameter portion of the positioning pin from the lateral direction. Then, a bolt is inserted into each bolt insertion hole of a tightening auxiliary member and the upper block and screwed into a screw hole of the lower block. In this way, the upper block and the lower block are joined.

SUMMARY

However, in the joining device of Japanese Patent Application Publication No. 2005-164021, when a sleeve having a fluid passage inside is provided between the pin insertion hole and the bolt insertion hole in the upper block, it is difficult to attach the auxiliary member in the above-mentioned manner.

Therefore, one of the objects of the present disclosure is to provide a joint structure that allows an upper block provided with a sleeve to be easily assembled to a lower block.

A joint structure according to one embodiment of the present disclosure includes an upper block arranged on a lower block having a fluid passage, in which a first pin insertion slit, a first sleeve insertion hole, and a first bolt insertion hole are formed, and the first sleeve insertion hole is located between the first pin insertion slit and the first bolt insertion hole; an auxiliary member provided on an upper surface of the upper block, in which a second pin insertion slit, a second sleeve insertion hole, and a second bolt insertion hole are formed, and the second sleeve insertion hole is located between the second pin insertion slit and the second bolt insertion hole; a sleeve inserted into the first sleeve insertion hole of the upper block and the second sleeve insertion hole of the auxiliary member, an inside of which serves as a fluid passage communicating with the fluid passage of the lower block; a pin having a first head, a first shaft portion, and a first male threaded portion, the first head abutting against an upper surface of the auxiliary member, the first shaft portion being inserted into the first pin insertion slit and the second pin insertion slit, and the first male threaded portion being screwed into the lower block; and a bolt having a second head, a second shaft portion, and a second male threaded portion, the second head abutting against the upper surface of the auxiliary member, the second shaft portion being inserted into the first bolt insertion hole and the second bolt insertion hole, and the second male threaded portion being screwed into the lower block. The first pin insertion slit opens to one side surface of the upper block in a longitudinal direction. The second pin insertion slit opens to one side surface of the auxiliary member in the longitudinal direction. A lower surface of the auxiliary member is formed by a pair of inclined surfaces that gradually extends away from the upper surface of the auxiliary member from both ends in the longitudinal direction toward a center.

DETAILED DESCRIPTION

A joint structure according to one embodiment of the present disclosure will be described with reference to the drawings. The joint structure constitutes a part of a gas line of an integrated type fluid control device.

Figure 1:
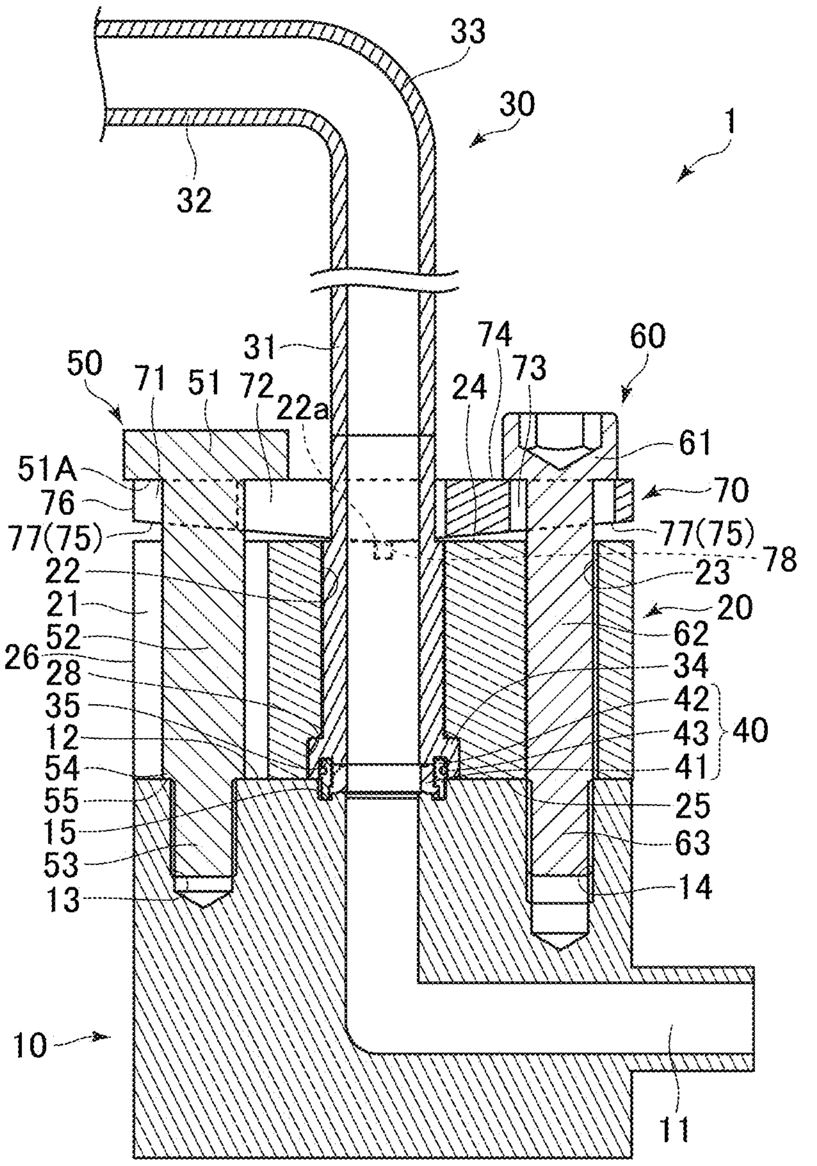
FIG. 1 is a cross-sectional view of a joint structure according to a first embodiment.

FIG. 1 is a cross-sectional view of a joint structure 1 according to a first embodiment.

The joint structure 1 includes a lower block 10, an upper block 20, a sleeve 30, a gasket portion 40, a pin 50, a bolt 60, and an auxiliary member 70.

The lower block 10 has a substantially rectangular parallelepiped shape and has a fluid passage 11 that is bent at a right angle. The lower block 10 has an upper surface 12. The fluid passage 11 opens at a central portion of the upper surface 12. The lower block 10 is formed with a pin screw hole 13 and a bolt screw hole 14, which are arranged on either side of the fluid passage 11, and both holes open to the upper surface 12. The upper surface 12 has a first annular recess 15 formed around the opening of the fluid passage 11.

Figure 2A:
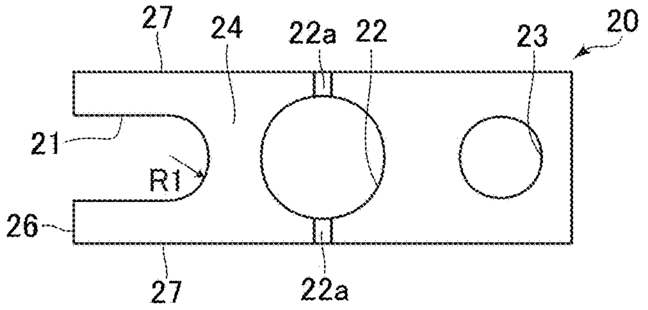
FIG. 2A is a plan view and FIG. 2B is a cross-sectional view of an upper block.
Figure 2B:
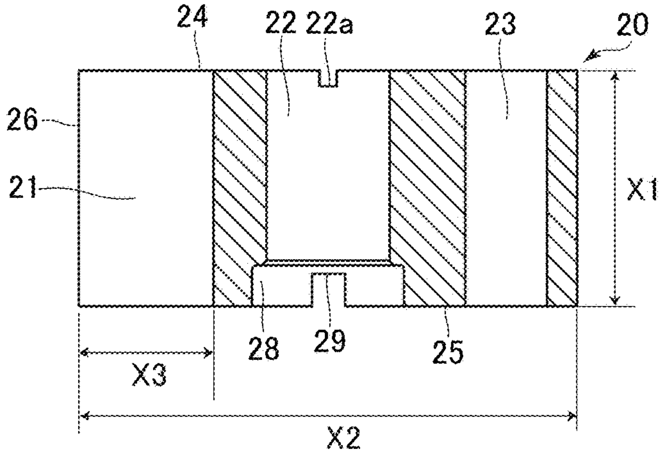

FIG. 2A shows a plan view and FIG. 2B shows a cross-sectional view of the upper block 20.

As shown in FIG. 1, the upper block 20 has a substantially rectangular parallelepiped shape and is disposed on the upper surface 12 of the lower block 10. As shown in FIG. 2A and FIG. 2B, the upper block 20 has a first pin insertion slit 21, a first sleeve insertion hole 22, and a first bolt insertion hole 23. In a longitudinal direction of the upper block 20, the first sleeve insertion hole 22 is located at the center, and the first pin insertion slit 21 and the first bolt insertion hole 23 are located on both sides of the first sleeve insertion hole 22. The first pin insertion slit 21 opens to an upper surface 24 and a lower surface 25 of the upper block 20, and also opens to one side surface 26 of the upper block 20 in the longitudinal direction. The first pin insertion slit 21 has a semi-oval shape (semi-elongated circular shape or semi-elliptical shape) in plan view.

The first sleeve insertion hole 22 opens to the upper surface 24 and the lower surface 25 of the upper block 20. A pair of first notches 22*a* is formed on the upper surface 24 of the upper block 20. Each of the first notches 22*a* extends from the first sleeve insertion hole 22 to penetrate a side surface 27 parallel to the longitudinal direction. Each of the first notches 22*a* has a rectangular shape when viewed from the side surface 27 side. The lower surface 25 of the upper block 20 has a second annular recess 28 formed around the opening of the first sleeve insertion hole 22. A pair of second notches 29 is formed on the lower surface 25 of the upper block 20. Each second notch 29 extends from the first sleeve insertion hole 22 to penetrate the side surface 27 parallel to the longitudinal direction. Each second notch 29 has a rectangular shape when viewed from the side surface 27 side. The first bolt insertion hole 23 opens to the upper surface 24 and the lower surface 25 of the upper block 20. The first sleeve insertion hole 22 and the first bolt insertion hole 23 have a substantially circular shape in plan view.

As shown in FIG. 1, the sleeve 30 is cylindrical, and the inside thereof serves as a fluid passage. This fluid passage communicates with the fluid passage 11 of the lower block 10. The sleeve 30 has two straight portions 31 and 32 and a bent portion 33. The straight portion 31 extends in a direction perpendicular to the upper surface 24 of the upper block 20, and the straight portion 32 extends parallel to the upper surface 24 of the upper block 20. The two straight portions 31 and 32 are connected by the bent portion 33. A lower end portion of the straight portion 31 is inserted into the first sleeve insertion hole 22. A flange portion 34 is provided at the lower end of the straight portion 31. The flange portion 34 is fitted into the second recess 28. An annular third recess 35 is formed on a lower surface of the straight portion 31 and the flange portion 34. The straight portion 32 and the bent portion 33 are positioned above the pin 50 so as to cover the pin 50.

As shown in FIG. 1, the gasket portion 40 includes a gasket 41, a retainer 42, and a snap ring 43. The gasket 41 and the retainer 42 are annular in shape. The gasket 41 is held by the retainer 42. The retainer 42 is held by the snap ring 43 formed of a metal wire having a circular cross section and formed into a C-shape. The gasket 41, the retainer 42, and the snap ring 43 are accommodated in the first recess 15 and the third recess 35.

Figure 3:
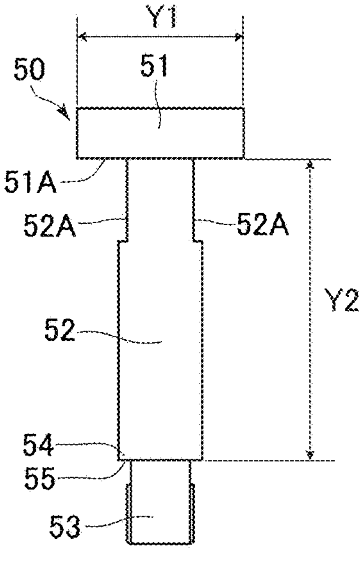
FIG. 3 is a side view of a pin.

FIG. 3 shows a side view of the pin 50.

As shown in FIG. 1 and FIG. 3, the pin 50 includes a first head 51, a first shaft portion 52, and a first male threaded portion 53. The first head 51 is disk-shaped. The first shaft portion 52 extends downward from a lower surface 51A of the first head 51 and is inserted into the first pin insertion slit 21. The first shaft portion 52 has a pair of flat surfaces 52A at its upper end. The first male threaded portion 53 is provided at a lower end portion of the first shaft portion 52 and is screwed into the pin screw hole 13. An outer diameter of the first male threaded portion 53 is configured to be smaller than an outer diameter of the first shaft portion 52. Therefore, a step portion 54 is formed by the first shaft portion 52 and the first male threaded portion 53. A step surface 55 of the step portion 54 abuts against the upper surface 12 of the lower block 10.

As shown in FIG. 1, the bolt 60 includes a second head 61, a second shaft portion 62, and a second male threaded portion 63. A hexagonal hole is formed in the head 61. The second shaft portion 62 extends downward from the second head 61 and is inserted into the first bolt insertion hole 23. The second male threaded portion 63 is provided at a lower end of the second shaft portion 62 and is screwed into the bolt screw hole 14.

Figure 4A:
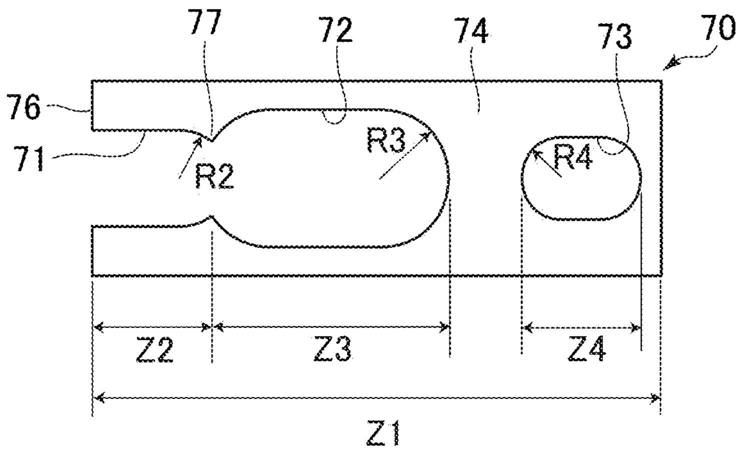
FIG. 4A is a plan view and FIG. 4B is a cross-sectional view of an auxiliary member.
Figure 4B:
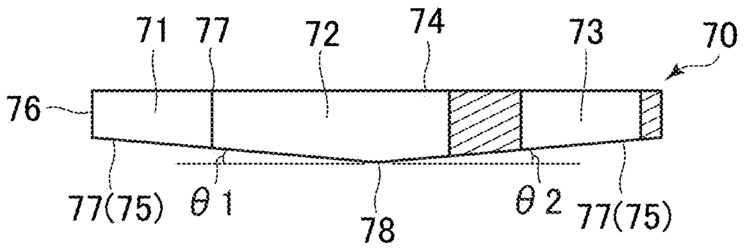

FIG. 4A shows a plan view and FIG. 4B shows a cross-sectional view of the auxiliary member 70.

The auxiliary member 70 has a rectangular plate-like shape in plan view, and is disposed on the upper surface 24 of the upper block 20. As shown in FIG. 4A and FIG. 4B, the auxiliary member 70 includes a second pin insertion slit 71, a second sleeve insertion hole 72, and a second bolt insertion hole 73. In a longitudinal direction of the auxiliary member 70, the second sleeve insertion hole 72 is located approximately at the center, and the second pin insertion slit 71 and the second bolt insertion hole 73 are located on both sides of the second sleeve insertion hole 72. In the present embodiment, the second pin insertion slit 71 and the second sleeve insertion hole 72 are connected and configured as one slit. The second pin insertion slit 71 opens to an upper surface 74 and a lower surface 75 of the auxiliary member 70, and also opens to one side surface 76 of the auxiliary member 70 in the longitudinal direction. The first pin insertion slit 71 has a semi-oval shape (semi-elongated circular shape or semi-elliptical shape) in plan view. A diameter of the arc portion of the second pin insertion slit 71 is smaller than a diameter of the arc portion of the second sleeve insertion hole 72, and the auxiliary member 70 has a constricted portion 77 at the connection portion between the second pin insertion slit 71 and the second sleeve insertion hole 72. The constricted portion 77 prevents the sleeve 30 from coming out of the second sleeve insertion hole 72.

The second sleeve insertion hole 72 opens to the upper surface 74 and the lower surface 75 of the auxiliary member 70. The second bolt insertion hole 73 opens to the upper surface 74 and the lower surface 75 of the auxiliary member 70. The second sleeve insertion hole 72 and the second bolt insertion hole 73 have a semi-oval shape (semi-elongated circular shape or semi-elliptical shape) in plan view. The lower surface 75 of the auxiliary member 70 is formed by a pair of inclined surfaces 77. The pair of inclined surfaces 77 makes the auxiliary member 70 thickest at its central portion in the longitudinal direction and thinnest at its ends. That is, the auxiliary member 70 has a pair of inclined surfaces 77 that gradually extends away from the upper surface 74 from both ends in the longitudinal direction toward the center. The auxiliary member 70 has a downward protrusion 78 formed by the pair of inclined surfaces 77.

Next, a method for assembling the joint structure 1 will be described.

FIG. 5A to FIG. 5D and FIG. 6A to FIG. 6C are explanatory diagrams of the method for assembling the joint structure 1.

Figure 5A:
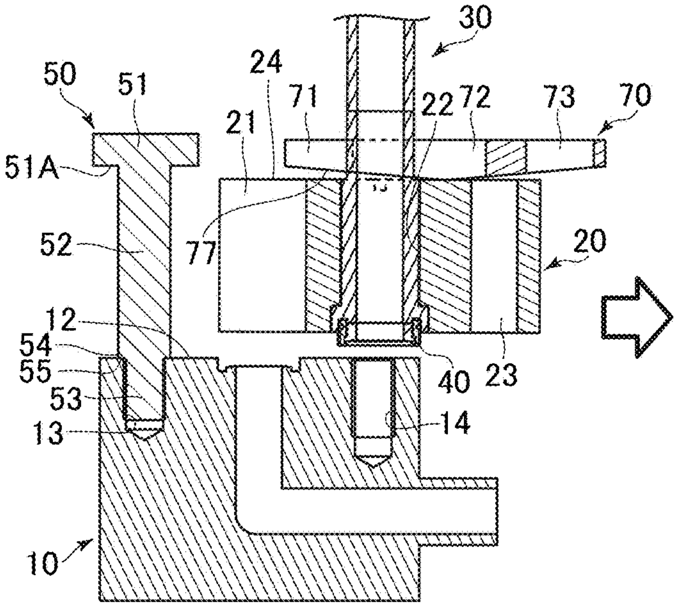
FIG. 5A to FIG. 5D are explanatory diagrams of a method for assembling the joint structure.

As shown in FIG. 5A, the first male threaded portion 53 of the pin 50 is screwed into the pin screw hole 13 of the lower block 10 until the step surface 55 abuts against the upper surface 12. With an assembly jig (not shown) clamping the pair of flat surfaces 52A, the pin 50 is screwed into the lower block 10 by rotating the pin 50. The sleeve 30 to which the gasket portion 40 is attached is inserted into the first sleeve insertion hole 22 of the upper block 20, and the second sleeve insertion hole 72 of the auxiliary member 70 is inserted into the sleeve 30. Specifically, the sleeve 30 up to the straight portion 31 is inserted through the upper block 20 and the auxiliary member 70. Then, a pipe that will become the bent portion 33 and the straight portion 32 is welded to the straight portion 31. The long straight portion 31 may be bent to form the bent portion 33 and the straight portion 32.

Figure 5B:
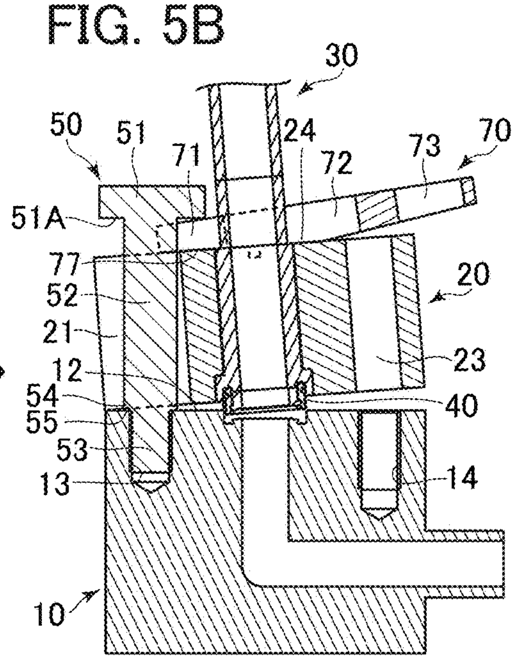

As shown in FIG. 5B, the upper block 20 and the sleeve 30 are slightly tilted, and one inclined surface 77 of the auxiliary member 70 abuts against the upper surface 24 of the upper block 20, and then the auxiliary member 70 is inserted between the first head 51 of the pin 50 and the lower block 10. At this time, the first shaft portion 52 of the pin 50 is inserted into the first pin insertion slit 21 and the second pin insertion slit 71.

Figure 5C:
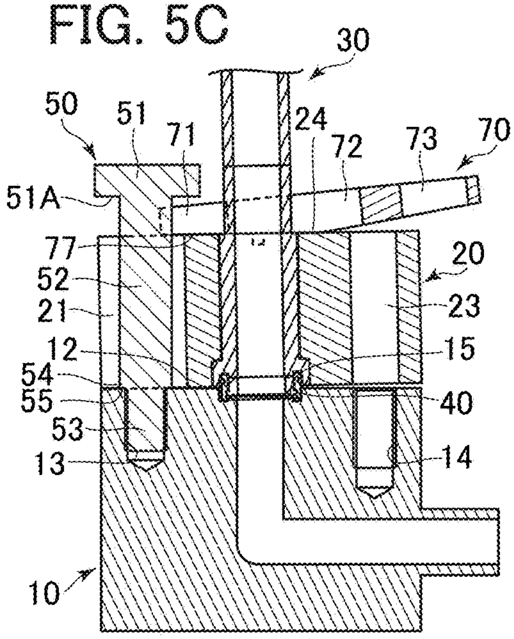
Figure 5D:
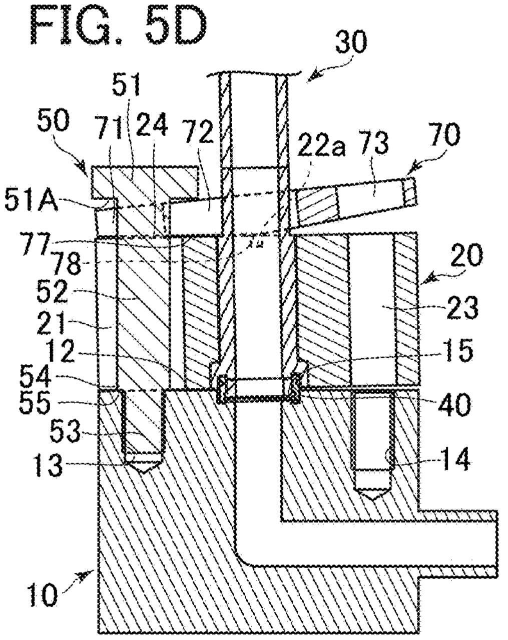

As shown in FIG. 5C, the gasket portion 40 is fitted into the first recess 15 of the lower block 10. As shown in FIG. 5D, the auxiliary member 70 is pushed toward the pin 50, and the protrusion 78 of the auxiliary member 70 faces the pair of first notches 22*a*.

Figure 6A:
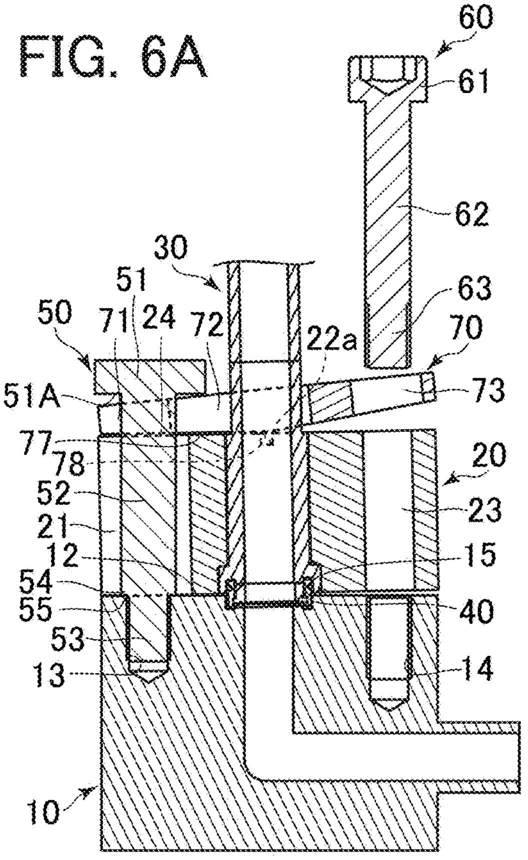
FIG. 6A to FIG. 6C are explanatory diagrams of a method for assembling the joint structure.
Figure 6B:
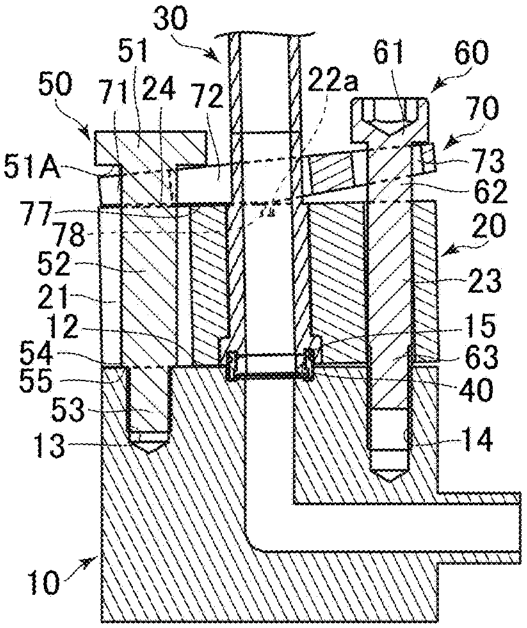
Figure 6C:
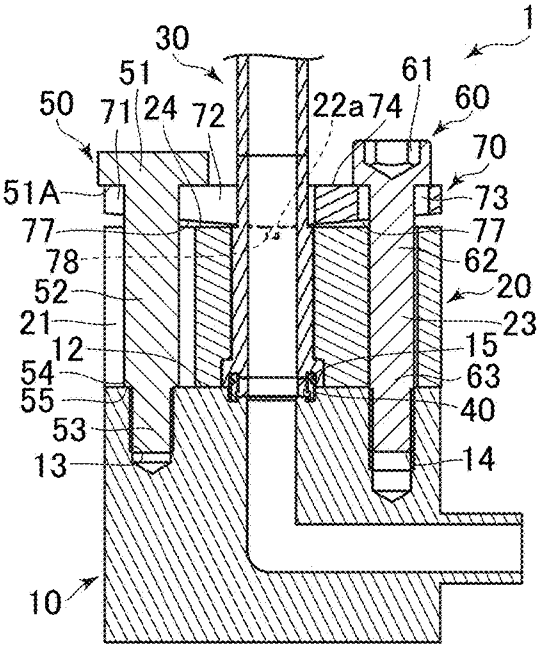

As shown in FIG. 6A and FIG. 6B, the bolt 60 is inserted into the second bolt insertion hole 73 and the first bolt insertion hole 23, and the male threaded portion 63 is screwed into the bolt screw hole 14. As a result, the upper block 20 is pushed toward the lower block 10 by the bolt 60, the protrusion 78 of the auxiliary member 70, and the first head 51 of the pin 50, and the gasket 41 is deformed. As shown in FIG. 6C, when the assembly of the joint structure 1 is completed, the upper surface 74 of the auxiliary member 70 and the upper surface 24 of the upper block 20 are parallel to each other.

When the assembly of the joint structure 1 is completed, a dimension from the upper surface 12 of the lower block 10 to the lower surface 51A of the first head 51 of the pin 50 (from the step surface 55 to the lower surface 51A) is configured to be the same as the sum of the thickness of the upper block 20 and the thickness of the auxiliary member 70 at the protrusion 78. In addition, the dimension from the upper surface 12 of the lower block 10 to the lower surface 51A of the first head 51 of the pin 50 (from the step surface 55 to the lower surface 51A) is configured to be larger than the sum of the thickness of the upper block 20 and the thickness of the end of the auxiliary member 70 on the second pin insertion slit 71 side. Therefore, the upper block 20 and the auxiliary member 70 can be inserted between the upper surface 12 of the lower block 10 and the lower surface 51A of the first head 51 of the pin 50, and the gasket 41 can be deformed to obtain a desired sealing effect.

For example, the joint structure 1 of the present embodiment can be realized by using the upper block 20, the pin 50, and the auxiliary member 70 having the following dimensions. The thickness X1 of the upper block 20 shown in FIG. 2A and FIG. 2B is 14.5 mm, the longitudinal width X2 of the upper block 20 is 30.5 mm, the depth X3 of the first pin insertion slit 21 is 8.25 mm, and the radius R1 of the arc portion of the first pin insertion slit 21 is 2.6 mm. The diameter Y1 of the first head 51 of the pin 50 shown in FIG. 3 is 10 mm, and the length from the lower surface 51A of the first head 51 to the step surface 55 is 18.2 mm. The longitudinal width Z1 of the auxiliary member 70 shown in FIG. 4A and FIG. 4B is 30.5 mm, the depth Z2 of the second pin insertion slit 71 (length to the boundary with the second sleeve insertion hole 72) is 6.4 mm, the longitudinal width Z3 of the second sleeve insertion hole 72 is 12.7 mm, and the longitudinal width Z4 of the second bolt insertion hole 73 is 6.4 mm. The radius R2 of the arc portion of the second pin insertion slit 71 is 2.6 mm, the radius R3 of the arc portion of the second sleeve insertion hole 72 is 3.7 mm, and the radius R4 of the arc portion of the second bolt insertion hole 73 is 2.2 mm. The angles θ1 and 02 of the inclined surfaces 77 are 5°.

According to the above joint structure 1, the first pin insertion slit 21 opens to one side surface 26 of the upper block 20 in the longitudinal direction, the second pin insertion slit 71 opens to one side surface 76 of the auxiliary member 70 in the longitudinal direction, and the lower surface 75 of the auxiliary member 70 is formed by a pair of inclined surfaces 77 that gradually extends away from the upper surface 74 of the auxiliary member 70 from both ends in the longitudinal direction toward the center. With this configuration, the upper block 20 and the sleeve 30 can be slightly inclined, and with one inclined surface 77 of the auxiliary member 70 abutting against the upper surface 24 of the upper block 20, they can be inserted between the first head 51 of the pin 50 and the lower block 10 from the lateral direction, and the first shaft portion 52 of the pin 50 can be inserted into the first pin insertion slit 21 and the second pin insertion slit 71. This makes it easier to assemble the upper block 20 provided with the sleeve 30 to the lower block 10. In addition, in a fluid control device in which pipes, such as the straight portion 32 and the bent portion 33 of the sleeve 30, are bent and densely arranged so as to cover one side of the upper block 20, there may be cases where the upper block 20 needs to be removed due to changes in specifications or other reasons. In such cases, there is no space for tools to enter on the side where the pipes are bent. However, with the joint structure 1, the upper block 20 can be removed by simply removing the bolt 60 on one side. In this way, according to the joint structure 1, the upper block 20 can be easily attached and removed using only the bolt 60 on one side.

With one inclined surface 77 of the auxiliary member 70 abutting against the upper surface 24 of the upper block 20, the auxiliary member 70 can be pushed toward the pin 50. This makes it possible to stabilize the posture of the auxiliary member 70 during assembly, making it easier to assemble the joint structure 1.

The first pin insertion slit 21 and the second pin insertion slit 71 have a semi-oval shape in plan view. Therefore, the first shaft portion 52 of the pin 50 can be easily inserted into the first pin insertion slit 21 and the second pin insertion slit 71. The second sleeve insertion hole 72 and the second bolt insertion hole 73 have an oval shape in plan view. Therefore, even when the sleeve 30 is inserted into the auxiliary member 70, the auxiliary member 70 can be moved, so that the auxiliary member 70 can be easily moved to a predetermined position in the upper block 20.

The upper surface 24 of the upper block 20 is formed with the first notch 22*a* extending from the first sleeve insertion hole 22 to penetrate the side surface 27 parallel to the longitudinal direction of the upper block 20. The protrusion 78 of the auxiliary member 70 fits into this first notch 22*a*, so that the force with which the auxiliary member 70 presses the upper block 20 can be stabilized.

The lower surface 25 of the upper block 20 is formed with a second notch 29 extending from the first sleeve insertion hole 22 to penetrate the side surface 27 parallel to the longitudinal direction of the upper block 20. When the upper block 20 is fixed to the lower block 10 by the bolt 60, the upper block 20 bends slightly to generate elastic force, and the sealing performance of the gasket 41 can be improved.

Next, a joint structure according to a second embodiment will be described. The same components as those of the joint structure 1 of the first embodiment are denoted by the same reference numerals and will not be described.

Figure 7:
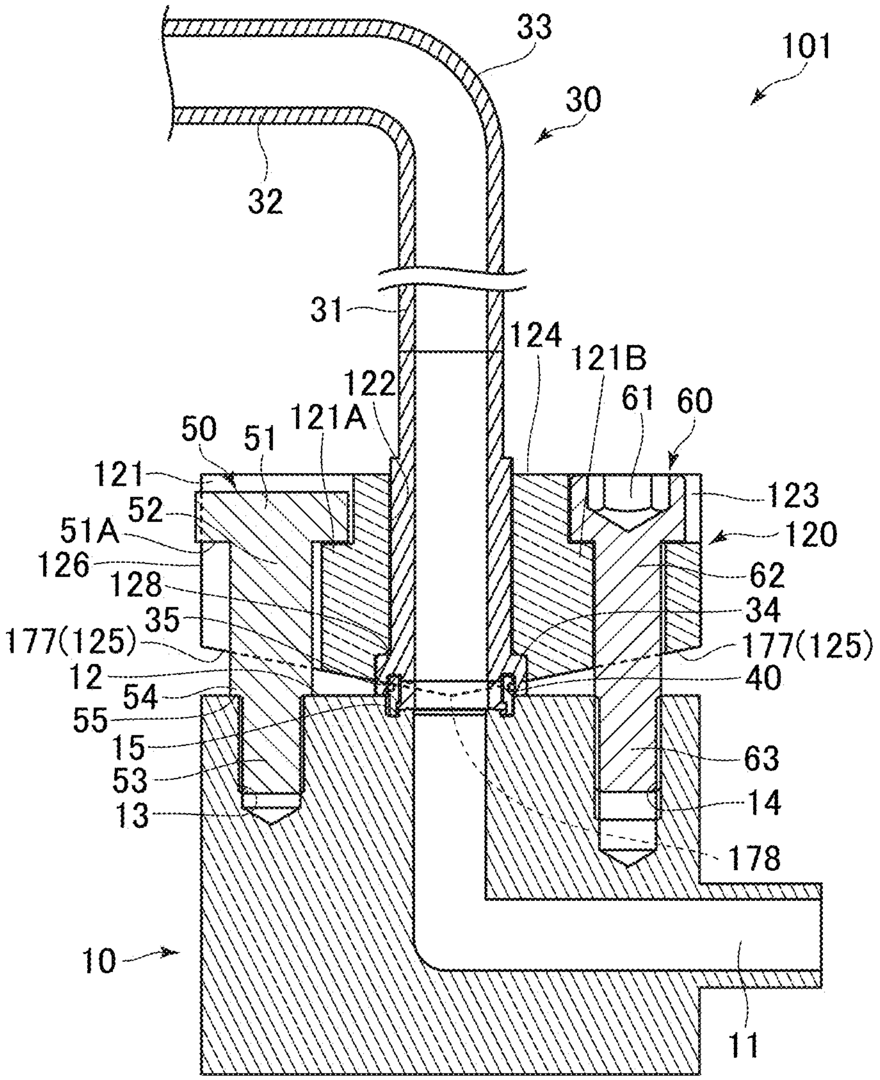
FIG. 7 is a cross-sectional view of a joint structure according to a second embodiment.

FIG. 7 shows a cross-sectional view of a joint structure 101 according to the second embodiment.

As shown in FIG. 7, the joint structure 101 includes the lower block 10, the upper block 120, the sleeve 30, the gasket portion 40, the pin 50, and the bolt 60.

The upper block 120 has a substantially rectangular parallelepiped shape and is disposed on the upper surface 12 of the lower block 10. The upper block 120 is formed with a third pin insertion slit 121, a third sleeve insertion hole 122, and a third bolt insertion hole 123. In a longitudinal direction of the upper block 120, the third sleeve insertion hole 122 is located at the center, and the third pin insertion slit 121 and the third bolt insertion hole 123 are located on both sides of the third sleeve insertion hole 122. The third pin insertion slit 121 opens to an upper surface 124 and a lower surface 125 of the upper block 120, and also opens to one side surface 126 of the upper block 120 in the longitudinal direction. The third pin insertion slit 121 has a semi-oval shape (semi-elongated circular shape or semi-elliptical shape) in plan view, similar to the first pin insertion slit 21 (FIG. 2A).

The third sleeve insertion hole 122 opens to the upper surface 124 and the lower surface 125 of the upper block 120. The lower surface 125 of the upper block 120 has a fourth annular recess 128 formed around the opening of the third sleeve insertion hole 122. The third bolt insertion hole 123 opens to the upper surface 124 and the lower surface 125 of the upper block 120. The third sleeve insertion hole 122 and the third bolt insertion hole 123 have a substantially circular shape in plan view. The upper part of the upper block 120, which is a portion forming the third pin insertion slit 121, is provided with a pin counterbore portion 121A. The upper part of the upper block 120, which is a portion forming the third bolt insertion hole 123, is provided with a bolt counterbore portion 121B. The first head 51 of the pin 50 abuts against the pin counterbore portion 121A, and the second head 61 of the bolt 60 abuts against the bolt counterbore portion 121B.

The lower surface 125 of the upper block 120 is formed by a pair of inclined surfaces 177. The pair of inclined surfaces 177 makes the upper block 120 thickest at its central portion in the longitudinal direction and thinnest at its ends. That is, the upper block 120 has the pair of inclined surfaces 177 that gradually extends away from the upper surface 124 from both ends in the longitudinal direction toward the center. The upper block 120 has a downward protrusion 178 formed by the pair of inclined surfaces 177.

When the assembly of the joint structure 101 is completed, the upper surface 124 of the upper block 120 and the upper surface 12 of the lower block 10 are parallel. The dimension from the upper surface 12 of the lower block 10 to the lower surface 51A of the first head 51 of the pin 50 (from the step surface 55 to the lower surface 51A) is configured to be larger than the thickness from an upper surface of the pin counterbore 121A of the pin step portion 121A to the end of the lower surface 125 on the third pin insertion slit 121 side. Therefore, the upper block 120 can be inserted between the upper surface 12 of the lower block 10 and the lower surface 51A of the first head 51 of the pin 50 while the upper block 120 is tilted, and the gasket 41 can be deformed to obtain a desired sealing effect. The inclination angle of each inclined surface 177 is preferably between 7° and 25°.

According to the above joint structure 101, the third pin insertion slit 121 of the upper block 120 opens to one side surface 126 of the upper block 120 in the longitudinal direction, and the lower surface 125 of the upper block 120 is formed by a pair of inclined surfaces 177 that gradually extends away from the upper surface 124 of the upper block 120 from both ends in the longitudinal direction toward the center. With this configuration, the upper block 120 and the sleeve 30 can be inserted between the first head 51 of the pin 50 and the lower block 10 from the lateral direction in a slightly inclined state, and the first shaft portion 52 of the pin 50 can be inserted into the third pin insertion slit 121. This makes it easy to assemble the upper block 120 provided with the sleeve 30 to the lower block 10.

Note that the present disclosure is not limited to the above-mentioned embodiment. A person skilled in the art can make various additions, modifications, and the like within the scope of the present disclosure.

For example, in the above embodiment, the angle of the inclined surface 77 was 5°, but it may be any angle between 5° and 15°. The inclination angles of the pair of inclined surfaces 77 and 177 were the same, but the angles may be changed. The lower surface 75 of the auxiliary member 70 is configured as an inclined surface 77, but the lower surface of the auxiliary member 70 may be a flat surface and the upper surface of the upper block 20 may be configured as an inclined surface.

What is claimed is:

1. A joint structure comprising:

an upper block arranged on a lower block having a fluid passage, in which a first pin insertion slit, a first sleeve insertion hole, and a first bolt insertion hole are formed, and the first sleeve insertion hole is located between the first pin insertion slit and the first bolt insertion hole;

an auxiliary member provided on an upper surface of the upper block, in which a second pin insertion slit, a second sleeve insertion hole, and a second bolt insertion hole are formed, and the second sleeve insertion hole is located between the second pin insertion slit and the second bolt insertion hole;

a sleeve inserted into the first sleeve insertion hole of the upper block and the second sleeve insertion hole of the auxiliary member, an inside of which serves as a fluid passage communicating with the fluid passage of the lower block;

a pin having a first head, a first shaft portion, and a first male threaded portion, the first head abutting against an upper surface of the auxiliary member, the first shaft portion being inserted into the first pin insertion slit and the second pin insertion slit, and the first male threaded portion being screwed into the lower block; and a bolt having a second head, a second shaft portion, and a second male threaded portion, the second head abutting against the upper surface of the auxiliary member, the second shaft portion being inserted into the first bolt insertion hole and the second bolt insertion hole, and the second male threaded portion being screwed into the lower block, wherein the first pin insertion slit opens to one side surface of the upper block in a longitudinal direction, the second pin insertion slit opens to one side surface of the auxiliary member in the longitudinal direction, and a lower surface of the auxiliary member is formed by a pair of inclined surfaces that gradually extends away from the upper surface of the auxiliary member from two ends of the auxiliary member in the longitudinal direction toward a center.

2. The joint structure according to claim 1, wherein the first pin insertion slit and the second pin insertion slit have a partial oval shape in plan view, and the second sleeve insertion hole has a partial oval shape in a plan view and the second bolt insertion hole has an oval shape in plan view.

3. The joint structure according to claim 1, wherein the upper surface of the upper block is formed with a first notch that extends from the first sleeve insertion hole to penetrate a side surface parallel to the longitudinal direction of the upper block.

4. The joint structure according to claim 1, wherein the lower surface of the upper block is formed with a second notch that extends from the first sleeve insertion hole to penetrate a side surface parallel to the longitudinal direction of the upper block.

* * * * *